US009065357B2

(12) United States Patent
Tabata

(10) Patent No.: US 9,065,357 B2
(45) Date of Patent: Jun. 23, 2015

(54) POWER CONVERSION CIRCUIT

(71) Applicant: MITSUBISHI ELECTRIC CORPORATION, Chiyoda-ku (JP)

(72) Inventor: Mitsuharu Tabata, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/204,624

(22) Filed: Mar. 11, 2014

(65) Prior Publication Data

US 2014/0192573 A1    Jul. 10, 2014

Related U.S. Application Data

(62) Division of application No. 13/010,365, filed on Jan. 20, 2011, now Pat. No. 8,716,986.

(30) Foreign Application Priority Data

May 7, 2010    (JP) ................................ 2010-107401

(51) Int. Cl.
*H02H 7/122*    (2006.01)
*H02M 7/538*    (2007.01)
*H02M 1/34*    (2007.01)

(52) U.S. Cl.
CPC ........ H02M 7/538 (2013.01); *H02M 2001/348* (2013.01)

(58) Field of Classification Search
CPC .................................................... H02M 7/538
USPC ................................ 363/50, 56.01–56.05, 55
See application file for complete search history.

(56) References Cited

U.S. PATENT DOCUMENTS

| 4,670,828 A | 6/1987 | Shekhawat et al. |
| 5,567,780 A | 10/1996 | Khouri |

(Continued)

FOREIGN PATENT DOCUMENTS

| DE | 10 2008 032 876 A1 | 1/2010 |
| JP | 63-38952 | 8/1988 |

(Continued)

OTHER PUBLICATIONS

Combined Chinese Office Action and Search Report issued May 20, 2014 in Patent Application No. 201110102118.1 with Partial English Translation and English Translation of Category of Cited Documents.

(Continued)

*Primary Examiner* — Matthew Nguyen
(74) *Attorney, Agent, or Firm* — Oblon, McClelland, Maier & Neustadt, L.L.P.

(57) ABSTRACT

A power conversion circuit includes a high side switching device connected at its collector to the high potential side of a power supply, a low side switching device connected at its emitter to the low potential side of the power supply, a first junction to which the emitter of the high side switching device and the collector of the low side switching device are connected, a first diode connected at its cathode to the collector of the high side switching device, a second diode connected at its anode to the emitter of the low side switching device, a second junction to which the anode of the first diode and the cathode of the second diode are connected, an inductance connected between the first and second junctions, and a snubber circuit connected to the first junction and adapted to absorb stored energy in the inductance when a freewheeling current flows.

6 Claims, 7 Drawing Sheets

(56) References Cited

U.S. PATENT DOCUMENTS

| | | | |
|---|---|---|---|
| 5,841,647 | A | 11/1998 | Hoshi |
| 5,880,949 | A | 3/1999 | Melhem et al. |
| 5,923,153 | A * | 7/1999 | Liu .............................. 323/222 |
| 7,321,483 | B2 | 1/2008 | Schetters |
| 7,579,814 | B2 * | 8/2009 | Orr .............................. 323/259 |
| 8,305,779 | B2 | 11/2012 | Lu et al. |
| 2009/0296429 | A1 | 12/2009 | Cook et al. |
| 2010/0039843 | A1 | 2/2010 | Takizawa |
| 2010/0162010 | A1 * | 6/2010 | Su et al. ........................ 713/300 |

FOREIGN PATENT DOCUMENTS

| | | |
|---|---|---|
| JP | 5-115181 | 5/1993 |
| JP | 6-165510 | 6/1994 |
| JP | 9-165510 A | 6/1997 |
| JP | 10-174424 A | 6/1998 |
| JP | 2002-171759 A | 6/2002 |
| JP | 2002-171759 A5 | 6/2002 |
| JP | 2002-247862 A | 8/2002 |
| JP | 2002-247865 A | 8/2002 |

OTHER PUBLICATIONS

"Realizing High-Efficiency Power Conversion with the New 3-Level Converter and New 3-Level Power Module," Fuji Electric Holdings Co., Ltd., http://www.fujielectric.com/news/2009/10020401.html, Feb. 4, 2010, 4 pages.

Japanese Office Action Issued Jun. 18, 2013 in Patent Application No. 2010-107401 (with partial English translation).

Combined Office Action and Search Report issued May 30, 2013 in Chinese Patent Application No. 201110102118.1 with partial English translation and English translation of categories of cited documents.

Office Action issued Jan. 20, 2014 to Chinese Patent Application No. 201110102118.1, with English translation.

Japanese Office Action issued Aug. 26, 2014, in Japan Patent Application No. 2013-247975 (with Partial English translation).

Office Action issued Jan. 8, 2015 in German Patent Application No. 10 2011 006 769.8 (with English translation).

* cited by examiner

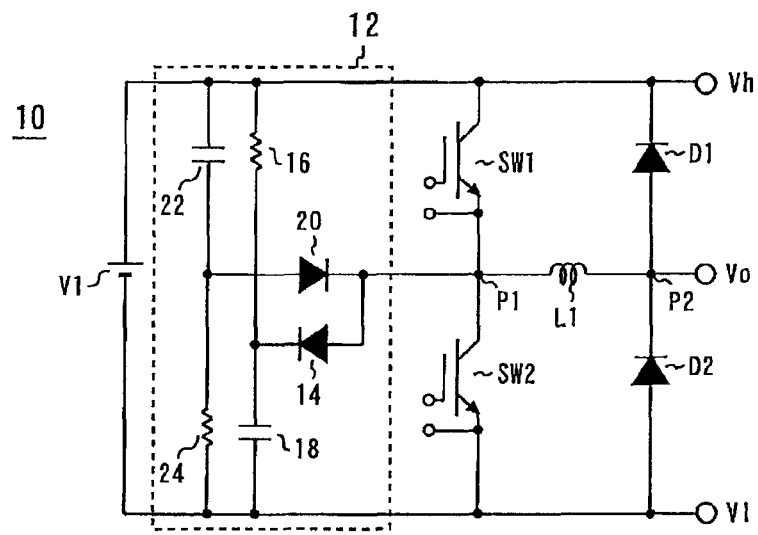
F I G. 1
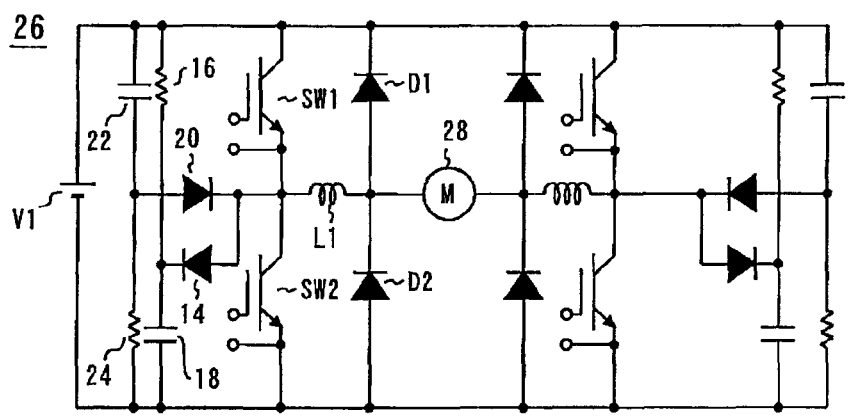
F I G. 2

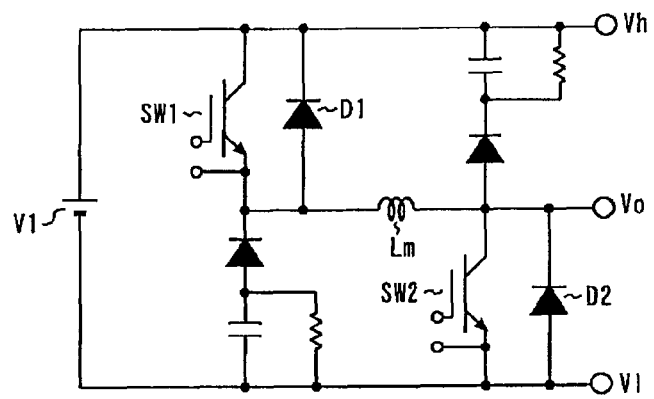
F I G. 5
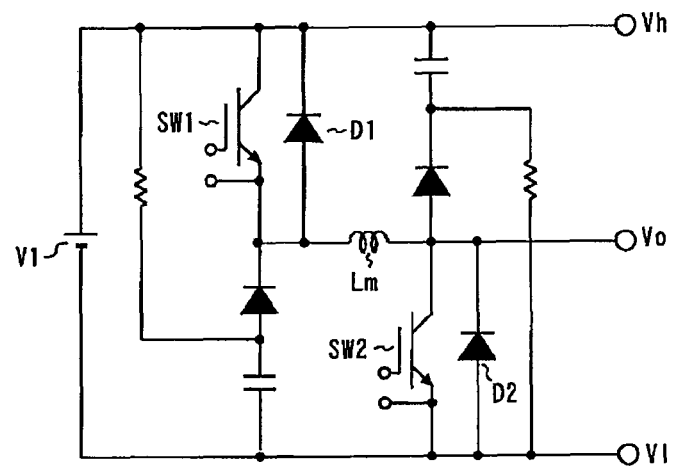
F I G. 6

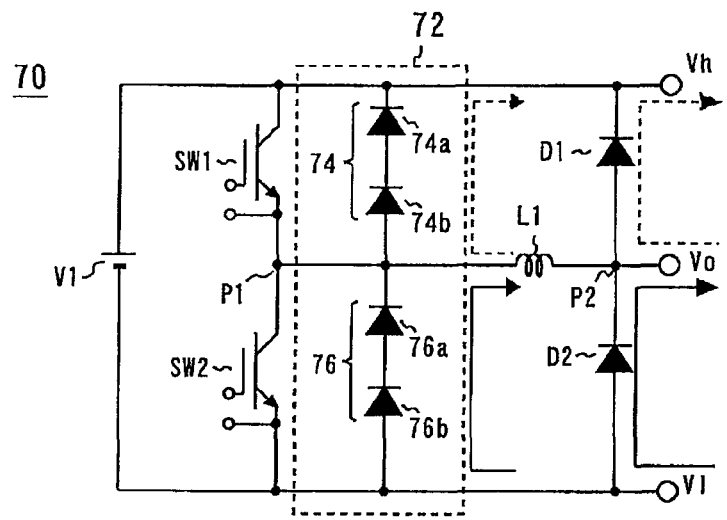
F I G. 7
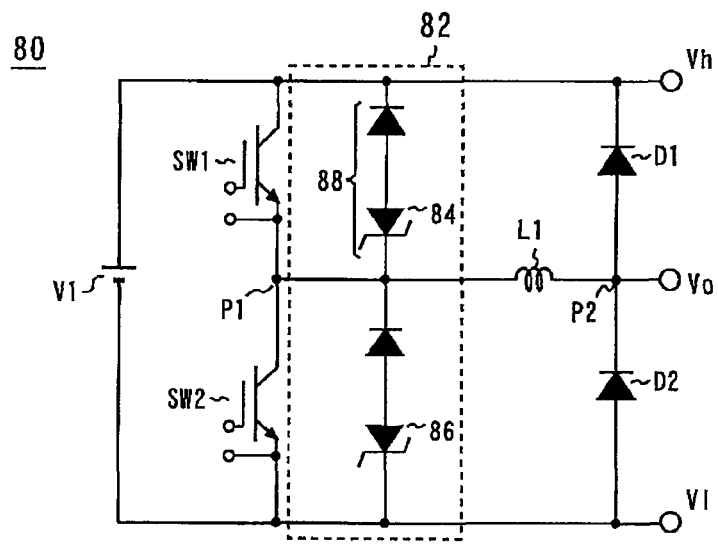
F I G. 8

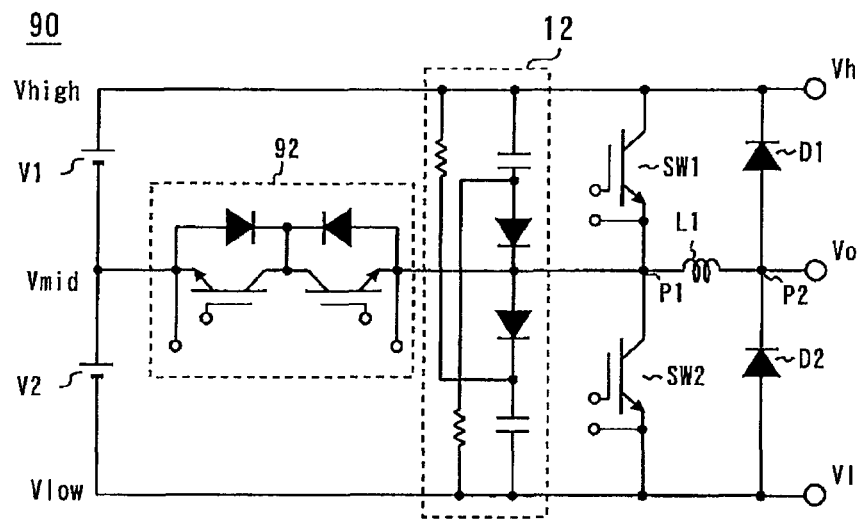
F I G. 9
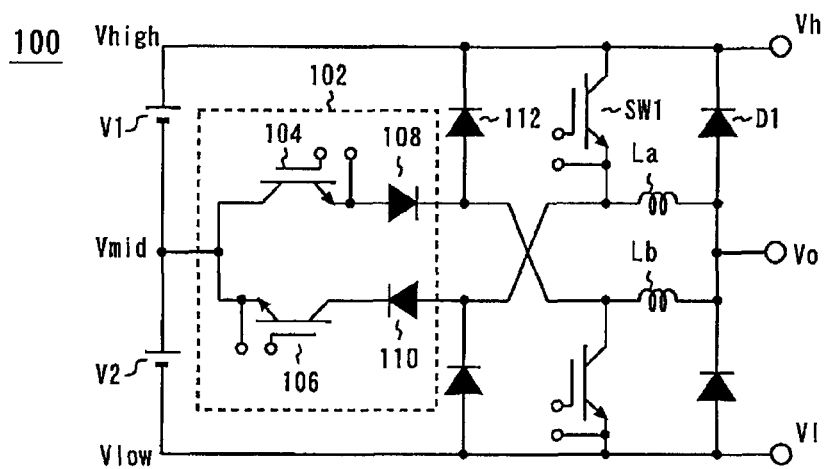
F I G. 10

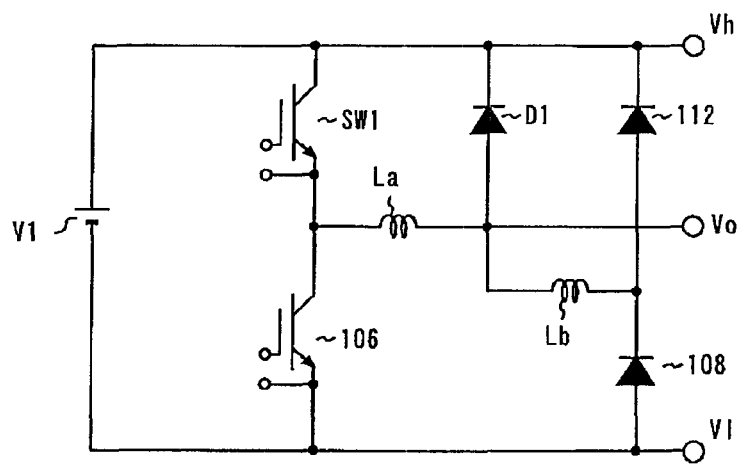
F I G. 11
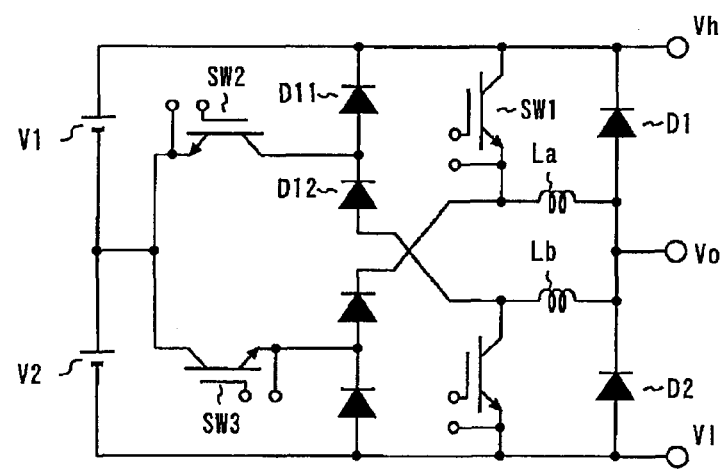
F I G. 12

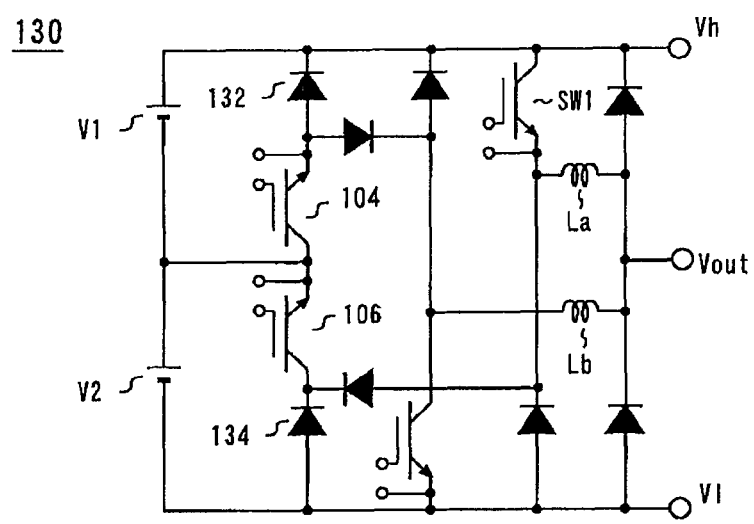
F I G. 1 3

POWER CONVERSION CIRCUIT

CROSS-REFERENCE TO RELATED APPLICATIONS

This application is a divisional of application Ser. No. 13/010,365, filed Jan. 20, 2011, which claims priority to Japanese Patent Application No. 2010-107401, filed May 7, 2010, the entire contents of each of which are incorporated herein by reference.

BACKGROUND OF THE INVENTION

1. Field of the Invention

The present invention relates to a power conversion circuit for providing a specific voltage waveform to an inductive load such as a squirrel cage induction motor.

2. Background Art

Examples of power conversion circuits for providing a specific voltage waveform to an inductive load such as a motor include inverters. Japanese Laid-Open Patent Publication No. H06-165510 discloses an inverter circuit having two half-bridge circuits. The half-bridge circuits include a high side switching device and a low side switching device connected in series across a power supply, a first diode connected in antiparallel with the high side switching device, and a second diode connected in antiparallel with the low side switching device. The first diode provides a freewheeling path for the stored energy discharged from the load (inductive load) when the low side switching device is turned off. The second diode, on the other hand, provides a freewheeling path for the stored energy discharged from the load when the high side switching device is turned off.

In such power conversion circuits, the two potentials of the DC power supply are alternately supplied to the external load with a suitable timing, thereby controlling the average load voltage and the average load current.

When the low side switching device is on, a current flows through the series circuit including the power supply, the load (inductive load), and the low side switching device. Then when the low side switching device is turned off from the on state, the current flowing through the inductive load does not immediately fall off, but tends to continue flowing. The result is that a current flows through the load and the first diode in a continuous loop. This current is referred to as a "freewheeling current."

When the freewheeling current is flowing in the first diode, if an on signal is applied to the gate of the low side switching device, the low side switching device gradually turns on. However, the first diode (through which the freewheeling current is flowing) does not immediately turn off and remains on until all the stored carriers in the diode are removed; that is, the first diode conducts in both the forward and reverse directions during that period. Thus, if the low side switching device is turned on when the first diode is in the conducting state, the power supply will be short circuited by the first diode and the low side switching device. This phenomenon is referred to as the "recovery" of the diode. The instantaneous short circuit current is referred to as "recovery current."

Since the recovery current is large and flows through the low side switching device, the current increases the switching loss of the switching device. This increase in the switching loss due to the recovery of the diode occurs regardless of the number of power supply voltages and the number of half-bridge circuits in the power conversion circuit.

SUMMARY OF THE INVENTION

The present invention has been made to solve the above problems. It is, therefore, an object of the present invention to provide an improved power conversion circuit in which the switching loss of the switching devices is reduced.

According to one aspect of the present invention, a power conversion circuit includes a high side switching device connected at its collector to the high potential side of a power supply, a low side switching device connected at its emitter to the low potential side of the power supply, a first junction to which the emitter of the high side switching device and the collector of the low side switching device are connected, a first diode connected at its cathode to the collector of the high side switching device, a second diode connected at its anode to the emitter of the low side switching device, a second junction to which the anode of the first diode and the cathode of the second diode are connected, an inductance connected between the first and second junctions, and a snubber circuit connected to the first junction and adapted to absorb stored energy in the inductance when a freewheeling current flows in the power conversion circuit.

According to another aspect of the present invention, a power conversion circuit which receives a high potential, a low potential, and a neutral potential intermediate between the high and low potentials, the power conversion circuit includes an AC switch connected so as to receive the neutral potentiall, and a switching device receiving the high potential at its collector and further receiving the neutral potential at its emitter through the AC switch. The AC switch includes a diode. An inductance is connected between the diode and the switching device.

Other and further objects, features and advantages of the invention will appear more fully from the following description.

BRIEF DESCRIPTION OF THE DRAWINGS

FIG. 1 is a circuit diagram of a power conversion circuit 10 of the first embodiment;

FIG. 2 is a circuit diagram of a variation of the power conversion circuit of the first embodiment;

FIG. 5 is an AC equivalent circuit diagram of the power conversion circuit shown in FIG. 4;

FIG. 6 is another AC equivalent circuit diagram of the power conversion circuit shown in FIG. 4;

FIG. 7 is a circuit diagram of a power conversion circuit of the third embodiment;

FIG. 8 is a circuit diagram of a power conversion circuit which is a variation of the power conversion circuit of the third embodiment;

FIG. 9 is a circuit diagram of a power conversion circuit of the fourth embodiment;

FIG. 10 is a circuit diagram of a power conversion circuit of the fifth embodiment;

FIG. 11 is a simplified partial circuit diagram derived from the circuit diagram of FIG. 10;

FIG. 12 is a circuit diagram of a variation of the power conversion circuit of the fifth embodiment; and FIG. 13 is a circuit diagram of a power conversion circuit of the sixth embodiment.

DETAILED DESCRIPTION OF THE PREFERRED EMBODIMENTS

First Embodiment

Figure 3:
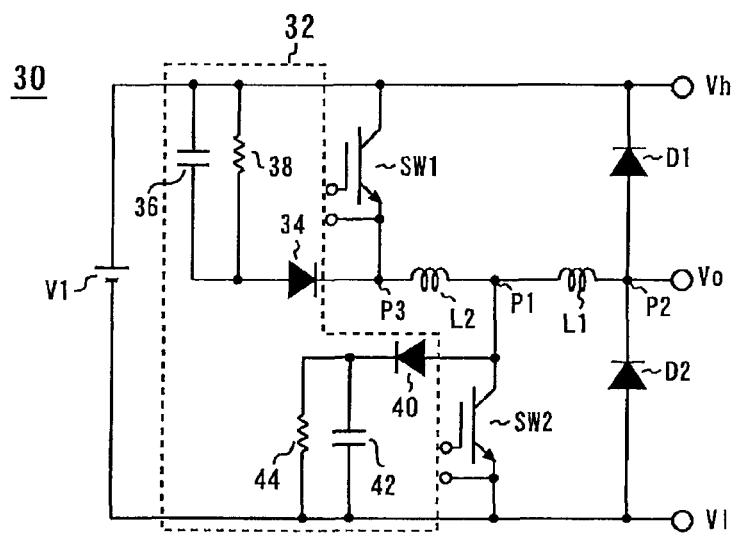
FIG. 3 is a circuit diagram of a power conversion circuit of the second embodiment.

A first embodiment of the present invention will be described with reference to FIG. 1. It should be noted that throughout the description of the first embodiment certain of the same or corresponding components are designated by the same reference symbols and described only once. This also applies to other embodiments of the invention subsequently described.

FIG. 1 is a circuit diagram of a power conversion circuit 10 of the first embodiment. The power conversion circuit 10 includes an output terminal Vo, a high side terminal Vh, and a low side terminal Vl. The output terminal Vo is connected to one end of the load, and the high side terminal Vh and the low side terminal Vl are connected to the other end of the load.

The power conversion circuit 10 includes a high side switching device SW1 (hereinafter referred to simply as the switching device SW1) and a low side switching device SW2 (hereinafter referred to simply as the switching device SW2). The switching devices SW1 and SW2 are, e.g., IGBTs. The collector of the switching device SW1 is connected to the high potential side of a power supply V1. The emitter of the switching device SW2 is connected to the low potential side of the power supply V1. The emitter of the switching device SW1 and the collector of the switching device SW2 are connected at a first junction P1.

The cathode of a first diode D1 is connected to the collector of the switching device SW1. The anode of a second diode D2 is connected to the emitter of the switching device SW2. The anode of the first diode D1 and the cathode of the second diode D2 are connected at a second junction P2. The output terminal Vo is also connected to the second junction P2.

A recovery suppression inductance L1 is connected between the first junction P1 and the second junction P2.

A snubber circuit 12 is connected to the first junction P1. The snubber circuit 12 provides a freewheeling path for the stored energy discharged from the recovery suppression inductance L1. The snubber circuit 12 includes a diode 14 and a diode 20. The anode of the diode 14 is connected to the first junction P1. The cathode of the diode 14 is connected to the high potential side of the power supply V1 through a resistance 16 and also connected to the low potential side of the power supply V1 through a capacitor 18.

On the other hand, the cathode of the diode 20 is connected to the first junction P1. The anode of the diode 20 is connected to the high potential side of the power supply V1 through a capacitor 22 and also connected to the low potential side of the power supply V1 through a resistance 24. It should be noted that the capacitances of the capacitors 18 and 22 are selected so that the voltage across each capacitor when charged is slightly lower than the forward and reverse withstand voltages of the switching device connected to the capacitor.

The operation of the power conversion circuit 10 will now be described. Let it be assumed that the switching device SW2 is turned on when a freewheeling current is flowing through the following path: load, output terminal Vo, first diode D1, high side terminal Vh, and back to load. This turn-on of the switching device SW2 eventually results in a current flowing through the following path: high potential side of power supply V1→high side terminal Vh→load→output terminal Vo→recovery suppression inductance L1→switching device SW2→low potential side of power supply V1.

Specifically, when the switching device SW2 is turned on, the voltage of the power supply V1 is first applied to the recovery suppression inductance L1. As a result, the collector current of the switching device SW2 rises gradually, not suddenly, due to the action of the recovery suppression inductance L1. (Switching in this manner is referred to as "zero current switching" or "ZCS.") Although the first diode D1 is conductive in both the forward and reverse directions at that time, the power supply V1 is not short circuited by the first diode D1 and the switching device SW2 and hence the recovery of the diode does not occur since the collector current of the switching device SW2 is suppressed by the recovery suppression inductor L1. Thus, this circuit configuration results in reduced switching loss of the switching devices.

It should be noted that the energy stored in the recovery suppression inductance L1 when the switching device SW2 is on acts to temporarily slightly increase the current flowing through the switching device SW2. However, the resulting increase in the power loss is insignificant compared to the decrease in the power loss due to the recovery current reducing action of the recovery suppression inductance L1.

The following describes the operation of the power conversion circuit 10 when the switching device SW2 is turned off from its on state. When a turn-off signal is input to the gate of the switching device SW2, the collector current of the switching device SW2 gradually decreases. At that time, the energy stored in the recovery suppression inductance L1 must be discharged therefrom in order to avoid damage to the switching device SW2 due to a turn-off surge voltage.

In the power conversion circuit 10 of the first embodiment, the energy stored in the recovery suppression inductance L1 is discharged through the first junction P1 and the diode 14 of the snubber circuit 12 thereby charging the capacitor 18 of the snubber circuit 12. This prevents damage to the switching device SW2 due to a turn-off surge voltage.

It should be noted that the voltage across the charged capacitor 18 is applied to the switching device SW2. However, the capacitance of the capacitor 18 is such that the voltage across the capacitor 18 when charged in the manner described above is slightly lower than the forward and reverse withstand voltages of the switching device SW2, thereby preventing degradation of the switching device SW2 due to the voltage of the capacitor 18. It should be noted that when the switching device SW2 is turned on again, the energy stored in the capacitor 18 is discharged through the second diode D2, the recovery suppression inductance L1, and the switching device SW2, so that the energy is consumed as heat in the switching device SW2.

This means that the energy discharged from the recovery suppression inductance L1 to charge the capacitor 18 when the switching device SW2 is turned off is a loss to the power conversion circuit 10. However, the total switching loss of the power conversion circuit 10 is greatly reduced by the recovery suppressing action of the recovery suppression inductance L1.

The above description has been directed to the operation of the power conversion circuit 10 when the switching device SW2 is turned on and off. It should be noted that when the switching device SW1 is turned on and off, the power conversion circuit 10 also operates in a manner similar to that described above in connection with the switching device SW2, resulting in reduced switching loss of the switching device SW1. Therefore, no description is provided of the operation of the power conversion circuit 10 when the switching device SW1 is turned on and off.

It will be noted that the use of a fast recovery diode (which has a short enough recovery time) results in a reduction in the recovery current. This method, however, presents problems such as increased transmission loss, increased frequencies of the components of the recovery waveform (which will cause noise, or EMI, and cause power loss due to electromagnetic induction, or skin effect), and reduced choices of components for the snubber circuit. On the other hand, the configuration of the power conversion circuit 10 of the first embodiment allows the recovery current to be reduced without the need that the diode connected in antiparallel with the switching device be a fast recovery diode, thus avoiding the foregoing problems.

Although the power conversion circuit 10 of the first embodiment is a half-bridge circuit, it is to be understood that the present invention is not limited to this type of power conversion circuit. That is, a plurality of the power conversion circuits 10 of the first embodiment may be combined to provide a power conversion circuit having a single AC phase, or three or more AC phases. FIG. 2 is a circuit diagram of a variation of the power conversion circuit 10 of the first embodiment. This power conversion circuit, 26, is of the single phase AC type. This power conversion circuit 26 includes two power conversion circuits 10 of FIG. 1 connected to a motor 28 serving as a load.

Further, the switching devices are not limited to IGBTs. The present embodiment only requires that the switching devices be transistors having a voltage drop greater than the forward voltage Vf of the diodes (i.e., transistors having a reverse blocking characteristic with respect to the diodes). For example, the switching devices may be power MOSFETs. Further, they may be made of SiC instead of Si.

Second Embodiment

A second embodiment of the present invention will be described with reference to FIG. 3. FIG. 3 is a circuit diagram of a power conversion circuit 30 of the second embodiment. The configuration of the power conversion circuit 30 allows it to use switching devices which are lower in cost than those of the power conversion circuit of the first embodiment while retaining the advantages of the first embodiment.

The power conversion circuit 30 includes a snubber circuit 32. The snubber circuit 32 includes a diode 34 and a diode 40. The cathode of the diode 34 is connected to the emitter of the switching device SW1. The junction between the cathode of the diode 34 and the emitter of the switching device SW1 is referred to herein as the third junction P3. In the present embodiment, a power loss reduction inductance L2 is connected between the third junction P3 and the first junction P1.

The anode of the diode 34 described above is connected to one end of a high side capacitor 36 and one end of a high side resistance 38. The other end of the high side capacitor 36 and the other end of the high side resistance 38 are connected to the collector of the switching device SW1.

The anode of the diode 40 is connected to the collector of the switching device SW2. The cathode of the diode 40 is connected to one end of a low side capacitor 42 and one end of a low side resistance 44. The other end of the low side capacitor 42 and the other end of the low side resistance 44 are connected to the emitter of the switching device SW2.

Thus, the collector and emitter of the switching device SW1 are connected to the high side capacitor 36 through the diode 34. Further, the collector and emitter of the switching device SW2 are connected to the low side capacitor 42 through the diode 40.

The operation of the power conversion circuit 30 will now be described. It should be noted that when each switching device is turned on, this power conversion circuit 30 operates to reduce the recovery current in the same manner as described above in connection with the first embodiment. Therefore, no description is provided of the operation of the power conversion circuit 30 when each switching device is turned on. The following description will be directed to the operation of the power conversion circuit 30 when the switching device SW2 is turned off from its on state. When the switching device SW2 is on, a current flows through the following path: high potential side of power supply V1→high side terminal Vh→load→output terminal Vo→recovery suppression inductance L1→switching device SW2→low potential side of power supply V1. Then when a turn-off signal is input to the gate of the switching device SW2, the collector current of the switching device SW2 gradually decreases. Further, the energy stored in the recovery suppression inductance L1 is transferred through the first junction P1 and the diode 40 to the low side capacitor 42.

It should be noted that the initial voltage across the low side capacitor 42 (i.e., the voltage across the capacitor 42 just before the switching device SW2 is turned off from its on state) is substantially zero. Therefore, the stored energy discharged from the recovery suppression inductance L1 acts to charge the low side capacitor 42. This charging prevents a sudden increase in the collector-emitter voltage Vce of the switching device SW2 when the switching device SW2 is turned off, resulting in reduced turn-off loss of the switching device SW2. (Switching in this manner is referred to as "zero voltage switching" or "ZVS.")

The energy transferred from the recovery suppression inductance L1 to the low side capacitor 42 is eventually consumed as heat in the low side resistance 44, instead of being consumed as heat in the switching device SW2, thereby eliminating the need for the switching device SW2 to have high heat resistance. This means that the switching device SW2 may be an inexpensive switching device having low heat resistance, resulting in reduced cost of the power conversion circuit 30. The switching device SW1 can also be implemented by an inexpensive switching device for the same reason.

The function of the power loss reduction inductance L2 will now be described. Let it be assumed that the switching device SW1 is turned off from its on state when a current is flowing through the following path: high potential side of power supply V1→switching device SW1→power loss reduction inductance L2→recovery suppression inductance L1→output terminal Vo→load→low side terminal Vl→low potential side of power supply V1. In that case, as a result of the turn-off of the switching device SW1, the energy stored in the power loss reduction inductance L2 and in the recovery suppression inductance L1 is transferred through the first diode D1 to charge the high side capacitor 36.

Then when the switching device SW2 is turned on, a current flows from the high side capacitor 36 to the switching device SW2. However, this current does not immediately rise to a high value, since the power loss reduction inductance L2 is connected between the high side capacitor 36 and the switching device SW2. Therefore, when the switching device SW2 is turned on, there is no possibility of a high current immediately flowing from the high side capacitor 36 to the switching device SW2, resulting in reduced turn-on loss of the switching device SW2.

Although the power conversion circuit 30 of the second embodiment includes two inductances, namely, the recovery suppression inductance L1 and the power loss reduction inductance L2, it is to be understood that the present invention is not limited to this particular implementation. The recovery suppression inductance L1 and the power loss reduction inductance L2 may be combined and implemented by a single inductance so that the power conversion circuit has a simple configuration.

Figure 4:
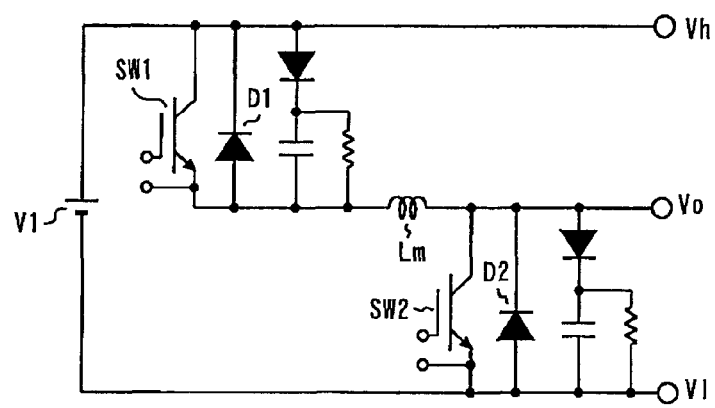
FIG. 4 is a circuit diagram of a variation of the power conversion circuit of the second embodiment.

FIGS. 4 to 6 show an exemplary configuration of a power conversion circuit that includes such a multi-function inductance. Specifically, FIG. 4 is a circuit diagram of a variation of the power conversion circuit of the second embodiment. This power conversion circuit includes a inductance Lm adapted to perform the functions of both the recovery suppression inductance L1 and the power loss reduction inductance L2 described above. FIG. 5 is an AC equivalent circuit diagram of the power conversion circuit shown in FIG. 4. FIG. 6 is another AC equivalent circuit diagram of the power conversion circuit shown in FIG. 4. The power conversion circuit shown in FIGS. 4 to 6 includes only one inductance and hence has a simpler configuration than the power conversion circuit 30 of the second embodiment including two inductances, yet retains the advantages of the power conversion circuit 30.

Third Embodiment

A third embodiment of the present invention will be described with reference to FIG. 7. FIG. 7 is a circuit diagram of a power conversion circuit 70 of the third embodiment. The power conversion circuit 70 has a simple configuration which ensures that the switching loss of the switching devices is reduced at low switching frequencies.

The power conversion circuit 70 includes a snubber circuit 72. The snubber circuit 72 includes two diode sets (or two small size diodes) 74 and 76. The diode set 74 includes a small diode 74a and a small diode 74b connected in series. The cathode of the diode 74a is connected to the cathode of the first diode D1. The anode of the diode 74a is connected to the cathode of the diode 74b. The anode of the diode 74b is connected to the first junction P1.

The diode set 76 includes a small diode 76a and a small diode 76b connected in series. The cathode of the diode 76a is connected to the first junction P1. The anode of the diode 76a is connected to the cathode of the diode 76b. The anode of the diode 76b is connected to the anode of the second diode D2.

The combined forward voltage of the diode set 74 (i.e., the forward bias required to pass a sufficient current through the diode set) is higher than the forward voltage of the first diode D1. Further, the combined forward voltage of the diode set 76 is higher than the forward voltage of the diode D2.

Let it be assumed that the switching device SW1 is turned off from its on state when a current is flowing through the following path: power supply V1→switching device SW1→recovery suppression inductance L1→load. In that case, as a result of the turn-off of the switching device SW1, freewheeling currents flow through the following two paths: (1) diode set 76→recovery suppression inductance L1→second junction P2→load low side terminal Vl→diode set 76; and (2) second diode D2→second junction P2→load→low side terminal Vl→second diode D2. (The directions of these freewheeling currents are indicated by solid arrows in FIG. 7.)

Since the combined forward voltage of the diode set 76 is higher than the forward voltage of the second diode D2, a voltage appears across both ends of the recovery suppression inductance L1, which voltage is the voltage difference between the diode set 76 and the second diode D2. This voltage causes the energy stored in the recovery suppression inductance L1 to be discharged through its freewheeling path (indicated by a solid arrow in FIG. 7).

The above description has been directed to the operation of the power conversion circuit 70 immediately after the switching device SW1 is turned off. It should be noted that when the switching device SW2 is turned off, the power conversion circuit 70 also operates in a manner similar to that described above, except that the freewheeling currents flow in the directions indicated by broken arrows in FIG. 7.

Thus, the power conversion circuit 70 of the third embodiment employs the snubber circuit 72 consisting of the two diode sets 74 and 76, instead of employing a complicated snubber circuit. Therefore, the power conversion circuit 70 has a simple configuration, yet the recovery suppression inductance L1 and the snubber circuit 72 still function to reduce the power loss of the switching devices, as in the first embodiment.

In the above example, the diode sets 74 and 76 of the snubber circuit 72 each include two diodes, that is, the snubber circuit 72 includes a total of four diodes. It is to be understood, however, that the snubber circuit 72 may include more diodes, that is, each diode set may include three or more diodes connected in series, if such increase in the number of diodes does not prevent the power conversion circuit 70 from having a simple configuration. The more diodes in each diode set, the higher the combined forward voltage of the diode set and the higher the voltage appearing across the recovery suppression inductance L1. This means that the number of diodes in each diode set may be increased to increase the rate at which the energy stored in the recovery suppression inductance L1 is discharged therefrom and thereby to increase the rate at which the current in the diode set falls off. In this way the recovery of each diode set 74, 76 can be quickly prevented.

FIG. 8 is a circuit diagram of a power conversion circuit 80 which is a variation of the power conversion circuit 70 of the third embodiment. This power conversion circuit 80 is constructed so that the voltage appearing across the recovery suppression inductance L1 is higher than it is in the power conversion circuit 70 and hence the energy stored in the inductance L1 is more quickly discharged therefrom. The snubber circuit 82 of the power conversion circuit 80 includes a zener diode 84 and a zener diode 86. The zener diode 84 is substituted for the diode 74b shown in FIG. 7, and is connected in reverse fashion to the diode 74a relative to the connection of the diode 74b to the diode 74a shown in FIG. 7. The zener diode 86 is substituted for the diode 76b shown in FIG. 7, and is connected in reverse fashion to the diode 76a relative to the connection of the diode 76b to the diode 76a shown in FIG. 7.

Thus, each diode set in the snubber circuit 82 includes a zener diode (namely, the zener diode 84 or 86) and therefore has a relatively high combined forward voltage. Therefore, for example, the diode set, 88, connected to the first diode D1 has a combined forward voltage significantly higher than the forward voltage of the first diode D1, allowing the energy stored in the recovery suppression inductance L1 to be quickly discharged therefrom.

Fourth Embodiment

A fourth embodiment of the present invention will be described with reference to FIG. 9. FIG. 9 is a circuit diagram of a power conversion circuit 90 of the fourth embodiment. The power conversion circuit 90 is a neutral point clamped three-level inverter circuit. The power conversion circuit 90 operates by receiving three potentials, namely, a high potential Vhigh, a low potential Vlow, and a neutral potential Vmid which is midway between the high and low potentials Vhigh and Vlow. The neutral potential Vmid is the potential at the junction between the power supply V1 and the power supply V2. The neutral potential Vmid is coupled to the first junction P1 through an AC switch 92. The power conversion circuit 90 includes the recovery suppression inductance L1 and the snubber circuit 12, as does the power conversion circuit 10 of the first embodiment.

Since the power conversion circuit 90 operates at a high voltage using two power supplies (namely, the power supplies V1 and V2), the first diode D1 and the second diode D2 are of the high voltage type. High voltage diodes generally exhibit a higher recovery current then ordinary diodes. However, the configuration of the power conversion circuit 90 allows the recovery suppression inductance L1 to reduce the recovery current, resulting in reduced switching loss of the switching devices. Further, the present embodiment also retains the advantages of the first embodiment.

Fifth Embodiment

A fifth embodiment of the present invention will be described with reference to FIGS. 10 and 11. FIG. 10 is a circuit diagram of a power conversion circuit 100 of the fifth embodiment. The power conversion circuit 100 is a neutral point clamped three-level inverter circuit and receives, as does the power conversion circuit 90 of the fourth embodiment, three potentials, namely, a high potential Vhigh, a low potential Vlow, and a neutral potential Vmid which is midway between the high and low potentials Vhigh and Vlow. The neutral potential Vmid is controlled by an AC switch 102. The AC switch 102 includes a switching device 104, a switching device 106, a diode 108, and a diode 110. (The switching devices 104 and 106 may be hereinafter referred to collectively as the intra-AC-switch switching devices.)

The neutral potential Vmid is coupled to the output terminal Vo through the switching device 104, the diode 108, and an inductance Lb. The anode of a diode 112 is connected to the cathode of the diode 108 and the inductance Lb. The cathode of the diode 112 is connected to the high side terminal Vh. The neutral potential Vmid is also coupled to the output terminal Vo through the switching device 106, the diode 110, and the inductance La.

During the periods when the potential at the output terminal Vo is higher than the neutral potential Vmid, the power conversion circuit 100 switches between the neutral potential Vmid and the high potential Vhigh. It should be noted that during the periods when the potential at the output terminal Vo crosses the neutral potential Vmid, the power conversion circuit 100 may switch between potentials in a different manner than that described above. However, since these periods are short as compared to the entire switching period, the power loss of the power conversion circuit 100 during these periods is not significant. Further, during the periods when the potential at the output terminal Vo is lower than the neutral potential Vmid, the power conversion circuit 100 operates in a manner exactly opposite to that in which it operates during the periods when the potential at the output terminal Vo is higher than the neutral potential Vmid. This means that if the power loss of the power conversion circuit 100 can be reduced during the periods when the potential at the output terminal Vo is higher than the neutral potential Vmid, then the same method can be used to reduce the power loss of the circuit during the periods when the potential at the output terminal Vo is lower than the neutral potential Vmid. Therefore, the following description will be directed only to a method of reducing the power loss of the power conversion circuit 100 during the periods when the potential at the output terminal Vo is higher than the neutral potential Vmid.

FIG. 11 is a simplified partial circuit diagram derived from the circuit diagram of FIG. 10, which only shows the components related to the operation of the power conversion circuit 100 during the periods when the potential at the output terminal Vo is higher than the neutral potential Vmid. During these periods, the diode 112, the first switching device SW1, the first diode D1, the switching device 106, and the diode 108 collectively operate as a two-level inverter. Specifically, either the first switching device SW1 and the switching device 104 are alternately turned on and off or the first diode D1 and the switching device 106 are alternately turned on and off, depending on the direction of the load current.

As can be seen from the circuit diagram shown in FIG. 11, the recovery of the first diode D1 is prevented by the inductance La connected between the first diode D1 and the switching device 106. Further, the recovery of the diode 108 is prevented by the inductances La and Lb connected in series between the diode 108 and the switching device SW1. It should be noted that the diode 108 in the AC switch 102 is of the high voltage type in order to suppress the recovery surge voltage. High voltage diodes generally exhibit a higher recovery current than ordinary diodes. However, the configuration of the power conversion circuit 100 of the fifth embodiment includes the inductances La and Lb to reduce the recovery current of the diode 108, thereby effectively reducing the power loss of the power conversion circuit 100.

Thus, the configuration of the power conversion circuit 100 allows for reduction of the power loss of the circuit during the periods when the potential at the output terminal Vo is higher than the neutral potential Vmid.

FIG. 12 is a circuit diagram of a variation of the power conversion circuit 100 of the fifth embodiment. The circuit configuration shown in FIG. 12 also retains the advantages of the power conversion circuit 100 of the fifth embodiment. Although the power conversion circuit 100 of the fifth embodiment does not include a snubber circuit for suppressing the surge voltages appearing across both ends of the intra-AC-switch switching devices, it is to be understood that such a snubber circuit may be incorporated in the power conversion circuit 100 to further reduce the power loss of the circuit.

Sixth Embodiment

A sixth embodiment of the present invention will be described with reference to FIG. 13. FIG. 13 is a circuit diagram of a power conversion circuit 130 of the sixth embodiment. The power conversion circuit 130 includes a diode 132 and a diode 134. The cathode of the diode 132 is connected to the high potential side of the first power supply V1, and the anode is connected to the emitter of the switching device SW2. The cathode of the diode 134 is connected to the collector of a switching device SW3, and the anode is connected to the low potential side of the second power supply V2. The diodes 132 and 134 function as snubber circuits for suppressing surge voltages across the intra-AC-switch switching devices. Thus the present embodiment can be used particularly to effectively suppress surge voltages in high-current neutral point clamped three-level inverter circuits and thereby to reduce the power loss of these inverter circuits.

Thus the present invention allows for reduction of the switching loss of the switching devices.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2010-107401, filed on May 7, 2010 including specification, claims, drawings and summary, on which the Convention priority of the present application is based, are incorporated herein by reference in its entirety.

What is claimed is:

1. A power conversion circuit comprising:
a high side switching device connected at its collector to the high potential side of a power supply;
a low side switching device connected at its emitter to the low potential side of said power supply;
a first junction to which the emitter of said high side switching device and the collector of said low side switching device are connected;
a first diode connected at its cathode to said collector of said high side switching device;
a second diode connected at its anode to said emitter of said low side switching device;
a second junction to which the anode of said first diode and the cathode of said second diode are connected;
an output terminal for providing an alternating current to an inductive load connected to the second junction;
an inductance connected between said first and second junctions; and
a snubber circuit connected to said first junction and adapted to absorb stored energy in said inductance when a freewheeling current flows in said power conversion circuit said snubber circuit including: a low side capacitor connected between said collector and said emitter of said low side switching device; a low side resistance connected in parallel with said low side capacitor; a high side capacitor connected between said collector and said emitter of said high side switching device; and a high side resistance connected in parallel with said high side capacitor.

2. The power conversion circuit according to claim 1, wherein said snubber circuit includes:
a first small size diode smaller than said first diode and connected at its cathode to said cathode of said first diode and at its anode to said first junction; and
a second small size diode smaller than said second diode and connected at its anode to said anode of said second diode and at its cathode to said first junction.

3. The power conversion circuit according to claim 1, wherein said snubber circuit includes:
a first zener diode connected at its cathode to said first junction and at its anode to said cathode of said first diode; and
a second zener diode connected at its anode to said first junction and at its cathode to said anode of said second diode.

4. The power conversion circuit according to claim 1, further comprising an AC switch connected to said first junction so as to supply a potential to said first junction.

5. The power conversion circuit according to claim 1, wherein said snubber circuit includes:
a first resistance connected at one end to the high potential side of the power supply;
a third diode connected at its anode to the first junction and at its cathode to another end of the first resistance;
a first capacitor connected at one end to the low potential side of the power supply and at another end to the cathode of the third diode;
a second resistance connected at one end to the low potential side of the power supply;
a fourth diode connected at its cathode to the first junction and at its anode to another end of the second resistance; and
a second capacitor connected at one end to the high potential side of the power supply and at another end to the anode of the fourth diode.

6. A power conversion circuit comprising:
a high side switching device connected at its collector to the high potential side of a power supply;
a low side switching device connected at its emitter to the low potential side of said power supply;
a power loss reduction inductance connected at one end to collector of said low side switching device forming a first junction, and at another end to the emitter of said high side switching device forming a third junction;
an output inductance connected at one end to the first junction and at another end to an output terminal for providing an alternating current to an inductive load forming a second junction;
a first diode connected at its cathode to said collector of said high side switching device;
a second diode connected at its anode to said emitter of said low side switching device, the anode of said first diode and the cathode of said second diode are connected to the second junction and the output terminal; and
a snubber circuit connected to said collector of said low side switching device and said emitter of said high side switching device and adapted to absorb stored energy in said output inductance when a freewheeling current flows in said power conversion circuit said snubber circuit including: a low side capacitor connected between said first junction and said low potential side of said power supply; a low side resistance connected in parallel with said low side capacitor; a high side capacitor connected between said third junction and said high potential side of said power supply; and a high side resistance connected in parallel with said high side capacitor.

* * * * *